(12) United States Patent
Watanabe et al.

(10) Patent No.: US 7,092,217 B2
(45) Date of Patent: Aug. 15, 2006

(54) MAGNETORESISTIVE HEAD

(75) Inventors: Katsuro Watanabe, Odawara (JP); Kikuo Kusukawa, Yoshikawa (JP); Kenichi Meguro, Matsuda (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 320 days.

(21) Appl. No.: 10/200,139

(22) Filed: Jul. 23, 2002

(65) Prior Publication Data

US 2003/0107848 A1 Jun. 12, 2003

(30) Foreign Application Priority Data

Dec. 11, 2001 (JP) .......................... P2001-376658

(51) Int. Cl.
*G11B 5/39* (2006.01)

(52) U.S. Cl. ..................................... 360/320

(58) Field of Classification Search ............... 360/320, 360/313, 319, 322, 324, 324.1, 324.2
See application file for complete search history.

(56) References Cited

U.S. PATENT DOCUMENTS

| 6,134,089 A * | 10/2000 | Barr et al. ................... 360/322 |
| 6,330,136 B1 * | 12/2001 | Wang et al. .............. 360/324.2 |
| 6,525,913 B1 * | 2/2003 | Mauri et al. ................. 360/320 |
| 6,529,353 B1 * | 3/2003 | Shimazawa .............. 360/324.2 |
| 6,762,910 B1 * | 7/2004 | Knapp et al. ................ 360/126 |
| 6,791,792 B1 * | 9/2004 | Takahashi .................... 360/112 |
| 6,895,658 B1 * | 5/2005 | Shimazawa et al. ..... 29/603.14 |
| 6,909,584 B1 * | 6/2005 | Nakashio et al. ......... 360/324.2 |

* cited by examiner

*Primary Examiner*—Angel Castro
(74) *Attorney, Agent, or Firm*—Antonelli, Terry, Stout and Kraus, LLP.

(57) ABSTRACT

A magnetoresistive head of CPP structure in which an insulating protective film 20 covers at least part of the boundary between the lower shield layer 10 and the non-magnetic film 11 adjacent thereto so as to reduce the area of the lower shield layer which is exposed on the surface of the substrate when the magnetoresistive film is patterned. This construction minimizes damage that occurs when the magnetoresistive film is patterned and also reduces the fraction defective due to current leakage across the upper and lower shields.

12 Claims, 10 Drawing Sheets

MAGNETORESISTIVE HEAD

BACKGROUND OF THE INVENTION

1. Field of the Invention

The present invention relates to a magnetoresistive head of the type in which sensing current is applied in the thickness direction of the magnetoresistive film, a magnetic disk apparatus provided with said magnetoresistive head, and a process for production of said magnetoresistive head.

2. Description of the Related Art

The magnetic data storage system has been increasing in areal recording density at a surprisingly fast annual rate of 100%. The high recording density requires the magnetic head mounted on the magnetic data storage system to have a higher output, a narrower track width, and a narrower shield-to-shield distance.

The object of increasing output is achieved by improving the performance of the magnetoresistive film. For recording densities up to several gigabits per square inch, an anisotropic magnetoresistive (AMR) film has been used. However, for recording densities higher than that, a giant magnetoresistive (GMR) film is being used now. The magnetoresistive film of next generation for GMR film includes the tunneling magnetoresistive (TMR) film (mentioned in Journal of Magnetism and Magnetic Materials, vol. 139, 1995, pp. L231–L234) and CPP (current perpendicular to the plane)-GMR film (mentioned in Journal of Applied Physics, vol. 89, 2001, pp. 6943–6945) in which current is applied in the direction perpendicular to the plane of the GMR film.

For reduction of track width, attempts are being made to develop a new exposure technology using a lithography apparatus equipped with a light source for shorter wavelength and to develop a new image enhancement technique. Possibility of further reduction in track width (smaller than a quarter micron or even a tenth of micron) is being investigated.

The object of reducing the shield-to-shield distance is hard to achieve for the GMR film of CIP (current into the plane) structure, in which sensing current flows into the plane of the magnetoresistive film. For CIP-GMR head, thin insulating gap films are provided between the shield film and the GMR film, and between the shield film and the electrode film to supply sensing current to the GMR film. Such a thin insulating gap film permits sensing current to leak to the shield film. In order to avoid this shortcoming, an idea of keeping the insulating gap film thick except for the read track part is disclosed in Japanese Patent Laid-open Nos. 111248/1994 and 111008/1996.

By contrast, the object of reducing the shield-to-shield distance is easy to achieve for the GMR film of CPP structure (in which sensing current flows in the direction perpendicular to the plane of the magnetoresistive film). CPP structure needs no insulating gap film unlike that of CIP structure. A magnetic head equipped with a TMR film (which is a magnetoresistive film of CPP structure) is disclosed in Japanese Patent Laid-open No. 213351/1999. According to this disclosure, the object of reducing the shield-to-shield distance is achieved by arranging a TMR element in the pedestal region formed in the upper and lower shields.

The disadvantageous technology (Japanese Patent Laid-open No. 213351/1999) mentions that it is necessary to form the pedestal region in the upper and lower shields in order to reduce the shield-to-shield distance in the case where a TMR film is used. In practice, however, it is also necessary to consider other structure than the read track for practical head structure.

To be concrete, in the production of a magnetoresistive head of CPP structure, it is important to pattern the magnetoresistive film into a desired shape without damage and to suppress leakage of sensing current across the upper and lower shields used as the electrodes.

OBJECT AND SUMMARY OF THE INVENTION

It is an object of the present invention to provide a magnetoresistive head of CPP structure with a magnetoresistive film of CPP type, including TMR film as well as CPP-GMR film, said magnetoresistive head being less liable to damage during patterning and having a high output and no leakage current across the upper and lower shields. It is another object of the present invention to provide a magnetic disk apparatus provided with said magnetoresistive head. It is further another object of the present invention to provide a process for producing said magnetoresistive head in high yields.

The present invention is directed to a magnetoresistive head of the type having a magnetoresistive film arranged between the lower shield layer and the upper shield layer, a pair of electrodes to apply sensing current in the thickness direction of said magnetoresistive film, and a detecting means to detect the change in resistance which said magnetoresistive film makes as the external magnetic field changes, wherein said lower shield layer has a non-magnetic layer adjacent to it and said non-magnetic film is separate from said lower shield layer by a boundary at least part of which is covered with an insulating protective film.

The present invention is directed also to a process for producing a magnetoresistive head having a magnetoresistive film arranged between the lower shield layer and the upper shield layer and a pair of electrodes to apply sensing current in the thickness direction of said magnetoresistive film, said process comprising a step of forming a lower shield layer on a substrate, a step of patterning said lower shield layer, a step of forming a non-magnetic film over the entire surface of the substrate, a step of planarizing said lower shield layer and said non-magnetic film such that they are approximately equal in thickness, a step of covering at least part of the boundary between said lower shield layer and said non-magnetic film, a step of forming a magnetoresistive film over the entire surface of the substrate, a step of patterning said magnetoresistive film, a step of covering with an insulating film at least part of the side wall formed by patterning said magnetoresistive film, and a step of forming the upper shield layer.

Other and further objects, features and advantages of the invention will appear more fully from the following description.

DESCRIPTION OF THE PREFERRED EMBODIMENTS

Figure 1:
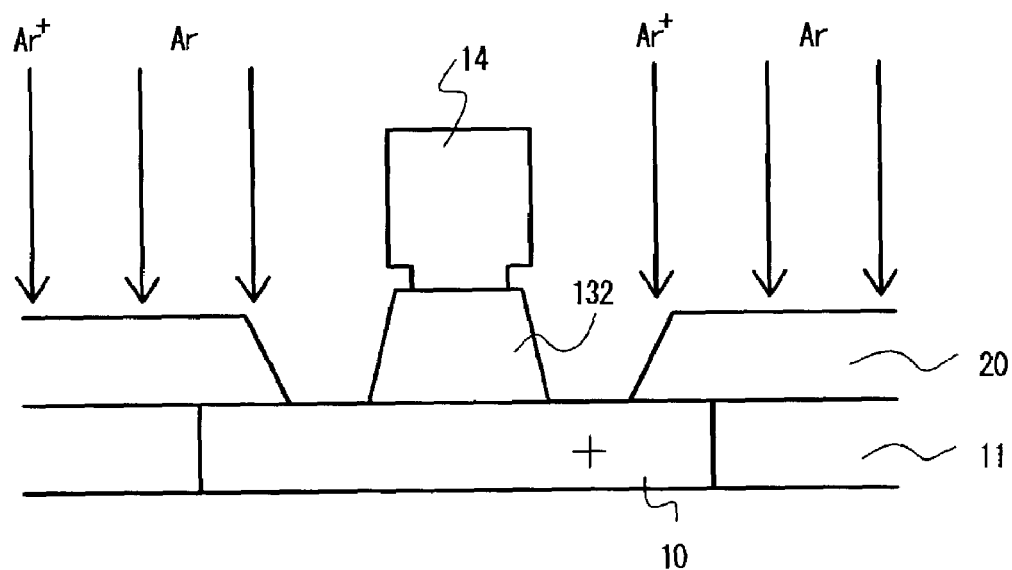
FIG. 1 is a schematic diagram showing the step of patterning the magnetoresistive film in the magnetoresistive head of CPP structure pertaining to one embodiment of the present invention.

In what follows, the invention will be described in more detail with reference to the accompanying drawings.

First, a mention is made of the difference in structure between the magnetoresistive head of CIP structure and the magnetoresistive head of CPP structure. This difference, which suggested the present invention, will be explained with reference to FIGS. 1 to 4.

In the case of a disadvantageous magnetoresistive head of CIP structure, the magnetoresistive film is patterned by etching steps shown in FIG. 2. First, a substrate (not shown) of alumina-titanium carbide ($Al_2O_3 \cdot TiC$) is coated with an insulating material such as alumina. On this insulating material are arranged a lower shield layer 10 and an insulating film 11 of non-magnetic material such that the former is held between the latter. They have an approximately equal thickness. On the lower shield layer 10 and the insulating film 11 is formed a lower gap layer 12 of insulating material. On the lower gap layer 12 is formed the magnetoresistive film 131 which is a metal multi-layered film. On the magnetoresistive film 131 is formed a resist mask 14 which defines the track width of the magnetoresistive film 131.

Figure 2A:
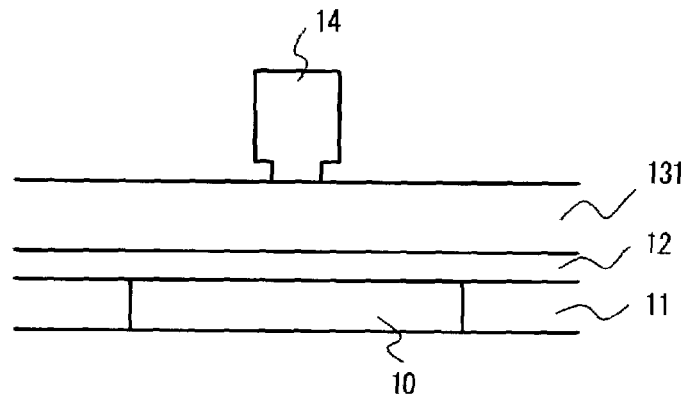
FIGS. 2A to 2C are schematic diagrams showing the steps of patterning the magnetoresistive film in the disadvantageous magnetoresistive head of CIP structure.
Figure 2B:
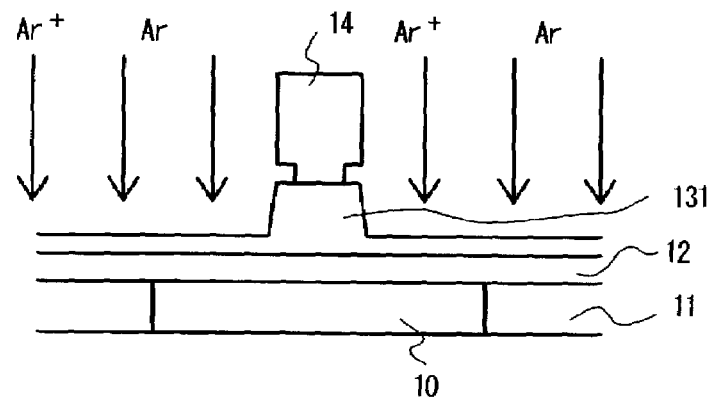
Figure 2C:
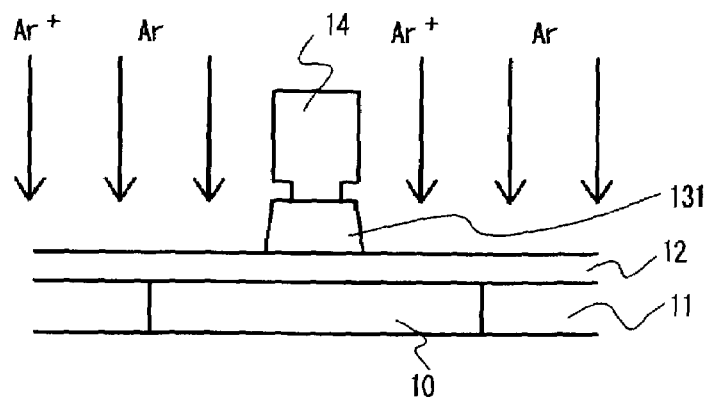
Figure 3A:
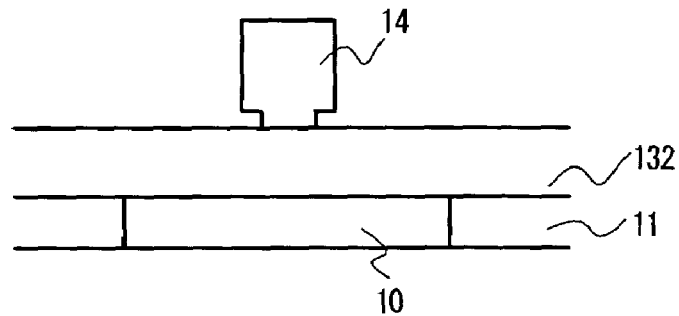
FIGS. 3A to 3D are schematic diagrams showing the steps of patterning the magnetoresistive film in the disadvantageous magnetoresistive head of CPP structure.
Figure 3B:
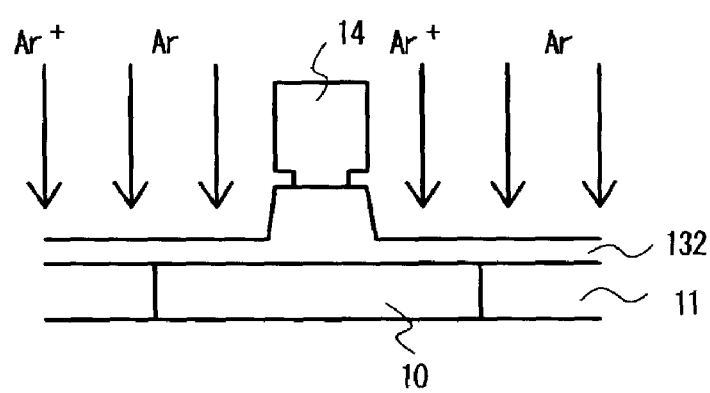
Figure 3C:
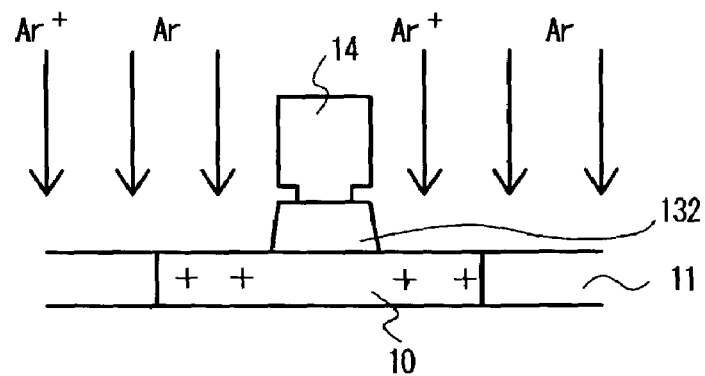
Figure 3D:
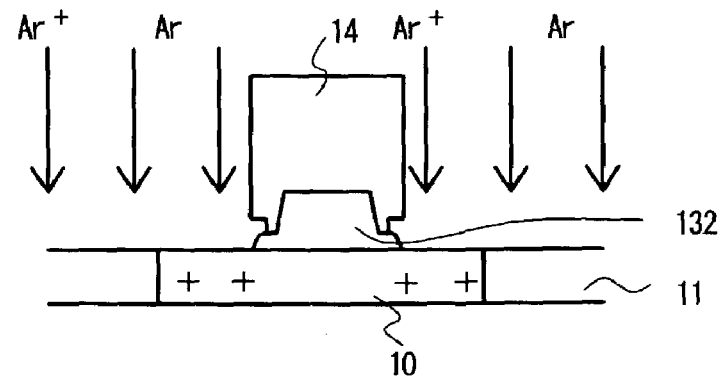

(See FIG. 2A.) The magnetoresistive film 131 undergoes etching by plasma process such as ion milling, so that a desired pattern is formed. Ideally, this plasma process is intended to neutralize accelerated ions from the plasma source and perform etching with electrically neutral atoms (such as Ar). In practice, however, due to difficulties in electrically neutralizing all ions completely, some ions (such as $Ar_{30}$) are applied to etched substance. In the intermediate stage of etching shown in FIG. 2B, the charge of ions impinging upon the magnetoresistive film 131 escapes through the substrate holder of the etching apparatus from the edge of the substrate, because the magnetoresistive film 131 extends continuously on the entire surface of the substrate. In the final stage of etching, shown in FIG. 2C, in which etching proceeds to such an extent that that part of the magnetoresistive film 131 which is not covered by the resist mask 14 is removed, atoms and ions generating from the plasma source impinge upon the lower gap layer 12 of insulating material. In this state, there exists no localized charge because the lower shield layer (which is made of metallic material) is not exposed on the surface of the substrate.

By contrast, in the case of a disadvantageous magnetoresistive head of CPP structure, the magnetoresistive film is patterned by etching steps shown in FIG. 3. The CPP structure is identical to the CIP structure in that both have the lower shield layer 10 and the non-magnetic insulating film 11 arranged adjacent to the former. However, the CPP structure differs from the CIP structure in that the former has the magnetoresistive film 132 placed directly on the lower shield layer 10 and the non-magnetic insulating film 11. In the intermediate stage of etching shown in FIG. 3B, the charge of unneutralized ions impinging upon the magnetoresistive film 132 escapes through the substrate holder of the etching apparatus from the edge of the substrate, because the magnetoresistive film 132 still covers the entire surface of the substrate. However, in the stage of etching shown in FIG. 3C, in which the magnetoresistive film 132 has been removed completely by etching, the lower shield layer 10 of metallic material is exposed on the surface of the substrate and is electrically isolated by the adjacent insulating film 11. Therefore, the charge of ions accumulates on the lower shield layer 10. This charge causes damage to the magnetoresistive film 132. This damage is more serious as the surface of the ion-irradiated metal film increases, on account of the antenna effect which collects charges.

In order to prevent damage due to ion irradiation at the time of etching, it is essential to neutralize ions completely. In practice, however, it is difficult to neutralize all of the ions evolved from the plasma source. An alternative way to prevent damage is to modify the head structure. This object has been achieved by the present invention.

According to the present invention, the magnetoresistive head is modified as follows.

A difference in level at the boundary between the lower shield layer and the non-magnetic film is tolerated.

The insulating protective film is formed such that the distance between the lower shield layer and the upper shield layer (measured at at least part of the boundary between the lower shield layer and the non-magnetic film adjacent to it) is larger than the distance between the lower shield layer and the upper shield layer (measured in the vicinity of the magnetoresistive film). Moreover, an insulating film is formed between the lower shield layer and the upper shield layer.

The vicinity of the magnetoresistive film is a range within 60 nm from both sides of the narrowest part of the magnetoresistive film.

The present invention is directed also to a magnetoresistive head of the type having a magnetoresistive film arranged between the lower shield layer and the upper shield layer, a pair of electrodes to apply sensing current in the thickness direction of said magnetoresistive film, and a detecting means to detect the change in resistance which said magnetoresistive film makes as the external magnetic field changes, wherein said lower shield layer is provided with an insulating protective film at the part except for the part on which the magnetoresistive film is arranged.

The above-mentioned magnetoresistive head is modified such that the insulating protective film is so formed as to cover that part on the lower shield layer which excludes the part on which the magnetoresistive film is arranged and at least part of the boundary between the lower shield layer and the non-magnetic film adjacent thereto.

According to the present invention, the above-mentioned process for producing the magnetoresistive head is modified as follows:

The step of planarizing is accomplished by mechanical polishing or chemical mechanical polishing.

The step of planarizing is accomplished by any of plasma etching, sputter etching, ion milling, and reactive ion etching.

The above-mentioned embodiments proved that the process of the present invention gives high-output magnetoresistive heads in high yields which are only little liable to damage at the time of patterning and are free of current leakage across the upper and lower shields.

The present invention covers also a magnetic data storage system in which the above-mentioned magnetoresistive head is used as the read head. The magnetic data storage system has a limited leakage of sensing current.

The example of the present invention will be described in more detail with reference to FIG. 1. FIG. 1 shows a stage in which etching has completely removed that part of the magnetoresistive film 132 which is not covered by the resist mask 14. It is to be noted that the insulating protective film 20 covers at least part of the boundary between the lower shield layer 10 and the non-magnetic insulating film 11 adjacent thereto and also covers that part on which the magnetoresistive film is not arranged. The thus formed insulating protective film 20 minimizes the area of the lower shield layer 10 which is exposed on the substrate surface after etching of the magnetoresistive film 132 has been completed. In this way it is possible to reduce the amount of charge accumulating on the lower shield 10.

In the above-mentioned example, the insulating protective film 20 produces a remarkable effect of improving yields up to 98% (yields in comparative examples are almost zero). Incidentally, the formation of the insulating protective film 20 can be confirmed by observing (with an SEM) the air bearing surface or by observing cross sectional structure along the element height direction.

It is also possible to reduce damage due to ion milling if another cover is formed on that part of the lower shield 10 on which the magnetoresistive film is not arranged.

Figure 4:
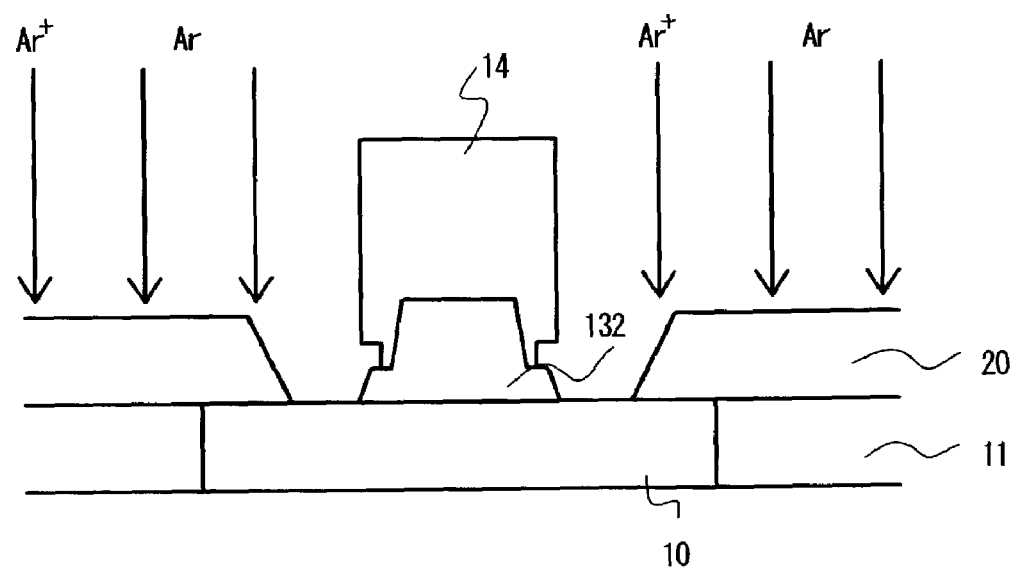
FIG. 4 is a schematic diagram showing the step of patterning the magnetoresistive film in the magnetoresistive head of CPP structure pertaining to another embodiment of the present invention.

It was found that the present invention produces its effect when the magnetoresistive film 132 is either tunneling magnetoresistive film or CPP-GMR film. It was also found that the present invention produces its effect not only in the case where the magnetoresistive film is etched in a trapezoidal form (as shown in FIG. 1) but also in the case where the magnetoresistive film is etched in a stepped trapezoidal form (as shown in FIG. 4).

The present invention may be applied, without loss of its essential effect, to other magnetoresistive film than that of CPP structure mentioned above or to etching in other shape than that mentioned above. Such magnetoresistive film includes semiconducting ferromagnetic film and half-metallic sensing film which would have a high magnetoresistive coefficient due to its 100% polarity.

Figure 5A:
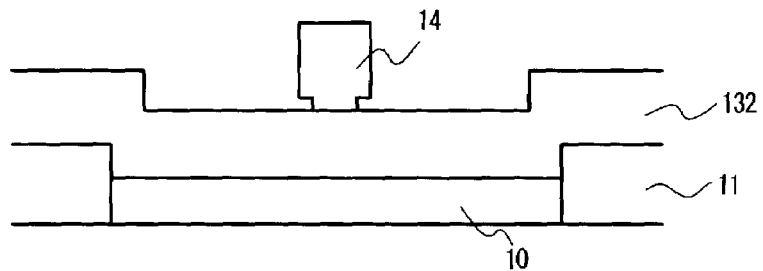
FIGS. 5A and 5B are schematic diagrams showing the steps of patterning the magnetoresistive film in a disadvantageous magnetoresistive head of CPP structure.

Other examples of the present invention will be explained with reference to FIGS. 5 and 6. The structure mentioned in the following is effective when the distance between the lower shield layer and the upper shield layer is reduced. The lower shield layer 10 and an insulating layer 11 which is an example of the non-magnetic film adjacent thereto undergo chemical mechanical polishing (CMP) so that they have the same height. This planarizing process permits accurate photolithography and fine patterning. Despite this planarizing process, there might occur a difference in level (about 50–100 nm high) at the boundary as shown in FIG. 5A because of difference in etching rate between the lower shield layer 10 (which is composed of metallic material) and the insulating layer 11 adjacent thereto. This difference in level will cause a serious problem in view of the fact that the distance between the upper and lower shield layers will be smaller than 100 nm (or even smaller than 50 nm as the recording density increases more in the future). Moreover, the interlayer insulating film between the upper and lower shield layers will be as thin as 100 nm in the head of CPP structure. Preventing leakage of sensing current and ensuring sufficient dielectric strength in this state are deeply concerned with the difference in level at the boundary between the lower shield layer 10 and the insulating layer 11 adjacent thereto. This problem is properly addressed in the example of the present invention as explained in the following.

First, problems involved in the conventional technology are explained with reference to FIG. 5.

Figure 5B:
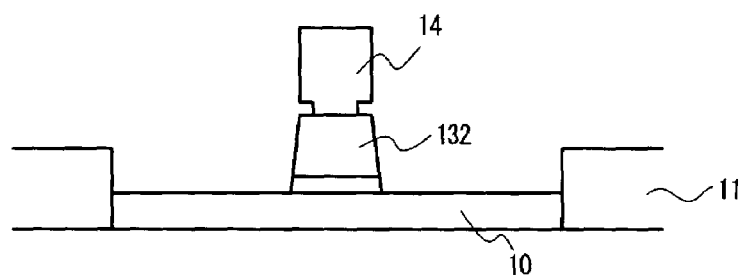
Figure 5C:
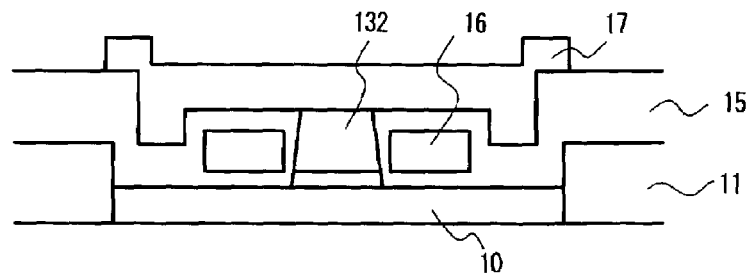
FIG. 5C is a schematic diagram showing the structure of the air bearing surface of the magnetoresistive head.
Figure 5D:
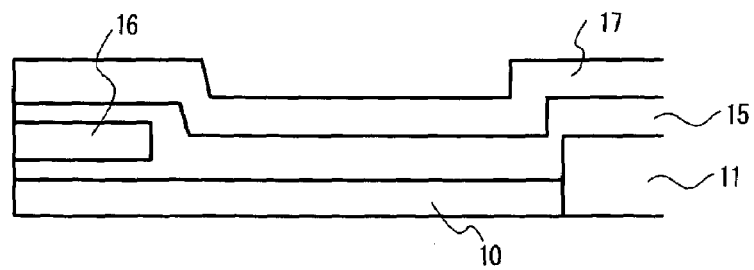
FIG. 5D is a sectional side view of the magnetoresistive head.
Figure 6A:
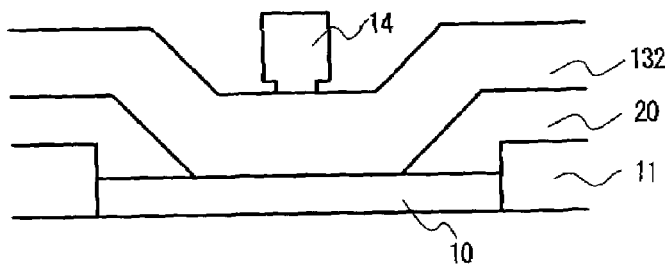
FIGS. 6A and 6B are schematic diagrams showing the steps of patterning the magnetoresistive film in the magnetoresistive head of CPP structure pertaining to one embodiment of the present invention.
Figure 6B:
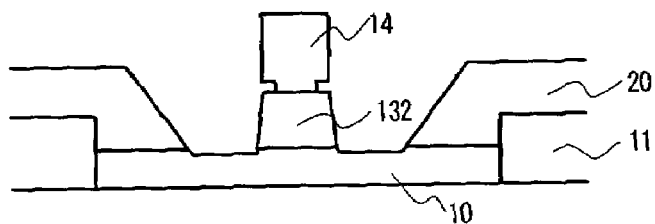
Figure 6C:
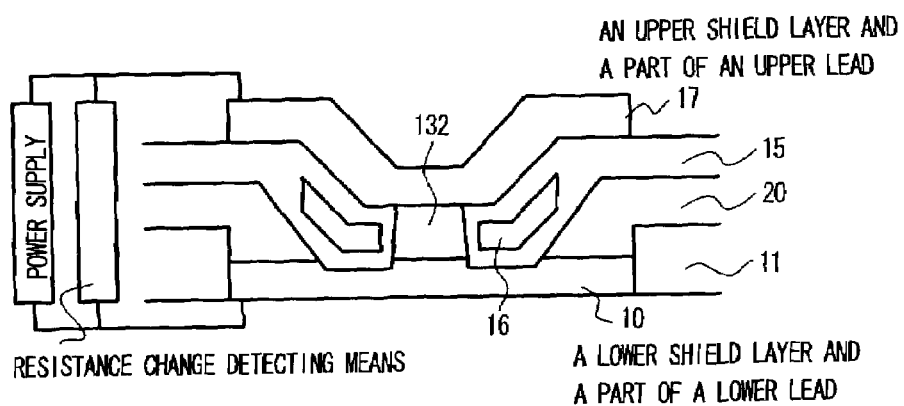
FIG. 6C is a schematic diagram showing the structure of the air bearing surface of the magnetoresistive head.
Figure 6D:
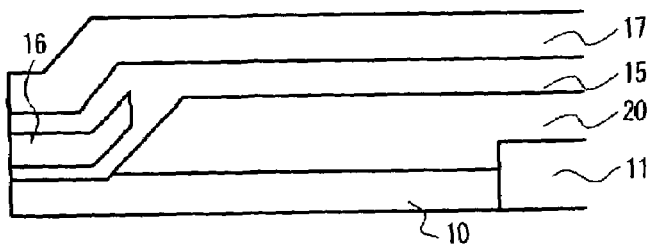
FIG. 6D is a sectional side view of the magnetoresistive head.
Figure 7A:
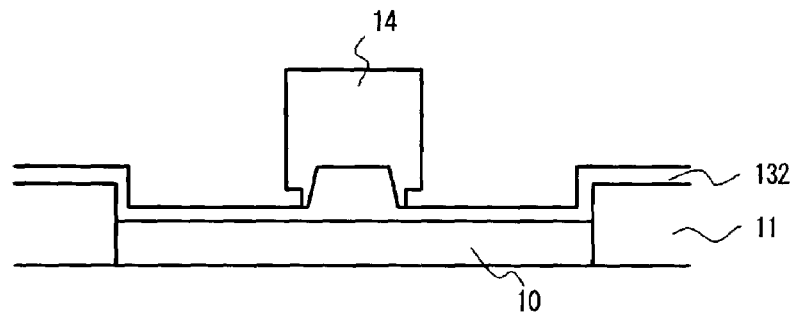
FIGS. 7A and 7B are schematic diagrams showing the steps of patterning the magnetoresistive film in another disadvantageous magnetoresistive head of CPP structure.
Figure 7B:
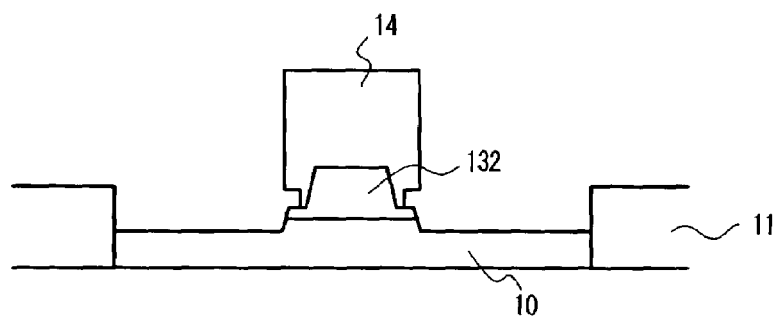
Figure 7C:
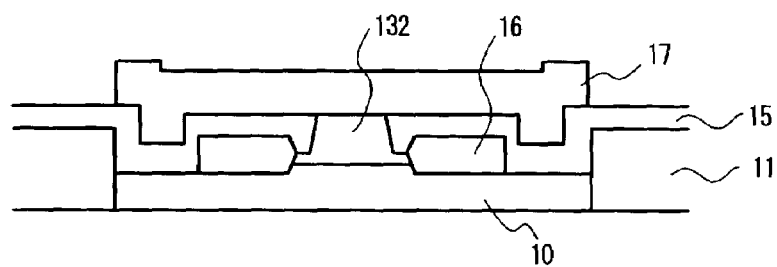
FIG. 7C is a schematic diagram showing the structure of the air bearing surface of the magnetoresistive head.
Figure 7D:
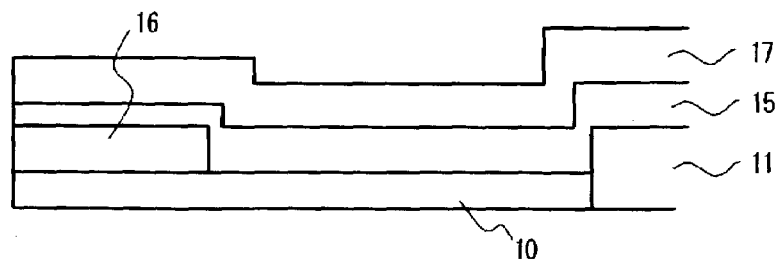
FIG. 7D is a sectional side view of the magnetoresistive head.
Figure 8A:
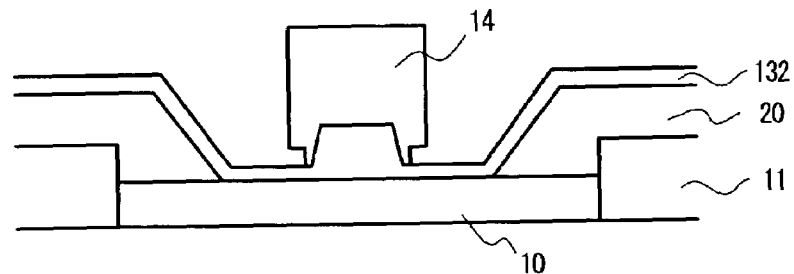
FIGS. 8A and 8B are schematic diagrams showing the steps of patterning the magnetoresistive film in the magnetoresistive head of CPP structure pertaining to another embodiment of the present invention.
Figure 8B:
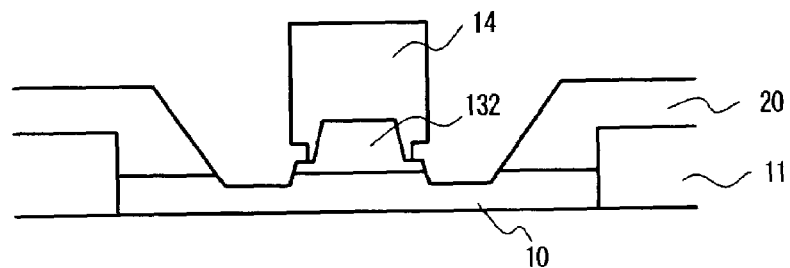
Figure 8C:
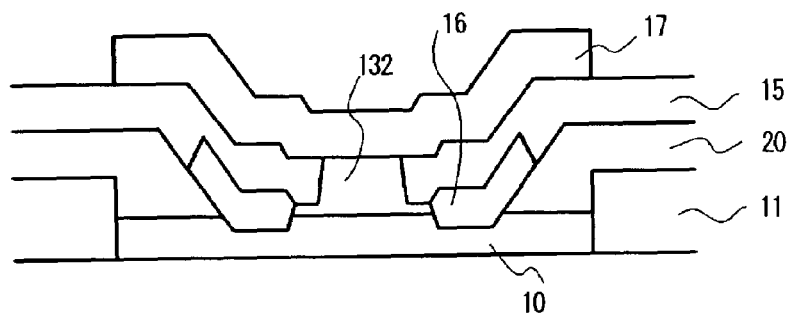
FIG. 8C is a schematic diagram showing the structure of the air bearing surface of the magnetoresistive head.
Figure 8D:
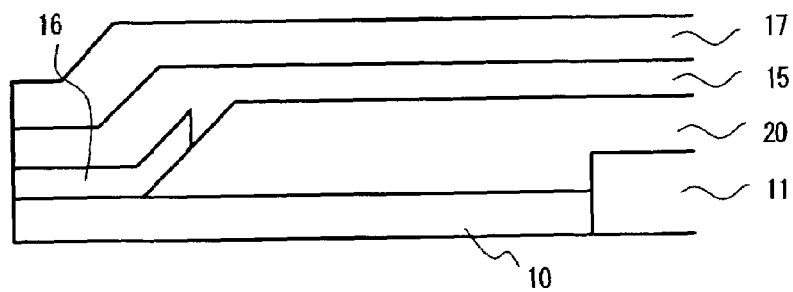
FIG. 8D is a sectional side view of the magnetoresistive head.

Etching starts when the process has proceeded to the stage shown in FIG. 5A. This etching removes that part of the magnetoresistive film 132 which is not covered by the resist mask 14. Slight over-etching is carried out intentionally in consideration of the different etching rate within the substrate and the process stability. Etching in this manner partly removes that part of the lower shield layer 10 which is not covered by the resist mask 14, as shown in FIG. 5B. Usually, the lower shield layer 10 is etched faster than the insulating layer 11, which results in a larger difference in level at the boundary between them. Subsequently, on the lower shield layer 10 and the insulating layer 11 are formed the shield interlayer insulating film 15, the longitudinal biasing layer 16, and the upper shield layer 17. The structure of these layers, as viewed from the air bearing surface, is shown in FIG. 5C. It should be noted that the shield interlayer insulating film 15 (between the lower shield layer 10 and the upper shield layer 17) is thin at the boundary between the lower shield layer 10 and the insulating layer 11. The thinned insulating film 15 tends to cause leakage of sensing current or breakdown. FIG. 5D is a cross sectional view in the direction of element height along the plane containing the longitudinal biasing layer 16. Leakage of sensing current tends to occur at the part (deep in the direction of element height) where the space between the lower and upper shield layers (10 and 17) is small.

FIG. 6 shows the structure pertaining to the present invention, in which the problems mentioned with reference to FIG. 5 are addressed. To be concrete, the structure in FIG. 6 differs from the structure in FIG. 5 in that the insulating protective film 20 is so formed as to cover the boundary between the lower shield layer 10 and the insulating film 11 adjacent thereto. As noted in FIGS. 6C and 6D, the insulating film between the lower shield layer 10 and the upper shield layer 17 is so thick that there hardly is the possibility of sensing current leakage and breakdown. Incidentally, the insulating protective film 20 should preferably be arranged as broadly as possible and as close to the magnetoresistive film 132 as possible. In practice, the insulating protective film 20 may extent to the point about 60 nm off the end of the magnetoresistive film in consideration of the accuracy of layer-to-layer alignment in lithography. In FIG. 6C, the upper shield layer 17 constitutes part of the upper electrode and the lower shield layer 10 constitutes part of the lower electrode. In addition, the upper and lower shield layers are connected to the power supply and the means to detect resistance changes as shown in FIG. 6C.

Incidentally, in the case where the magnetoresistive film 132 is patterned in a stepped trapezoidal shape as shown in FIG. 7, current leakage tends to occur at the narrow part between the lower shield layer 10 and the upper shield layer 17. This problem is solved by arranging the insulating protective film 20 as shown in FIG. 8.

Figure 9:
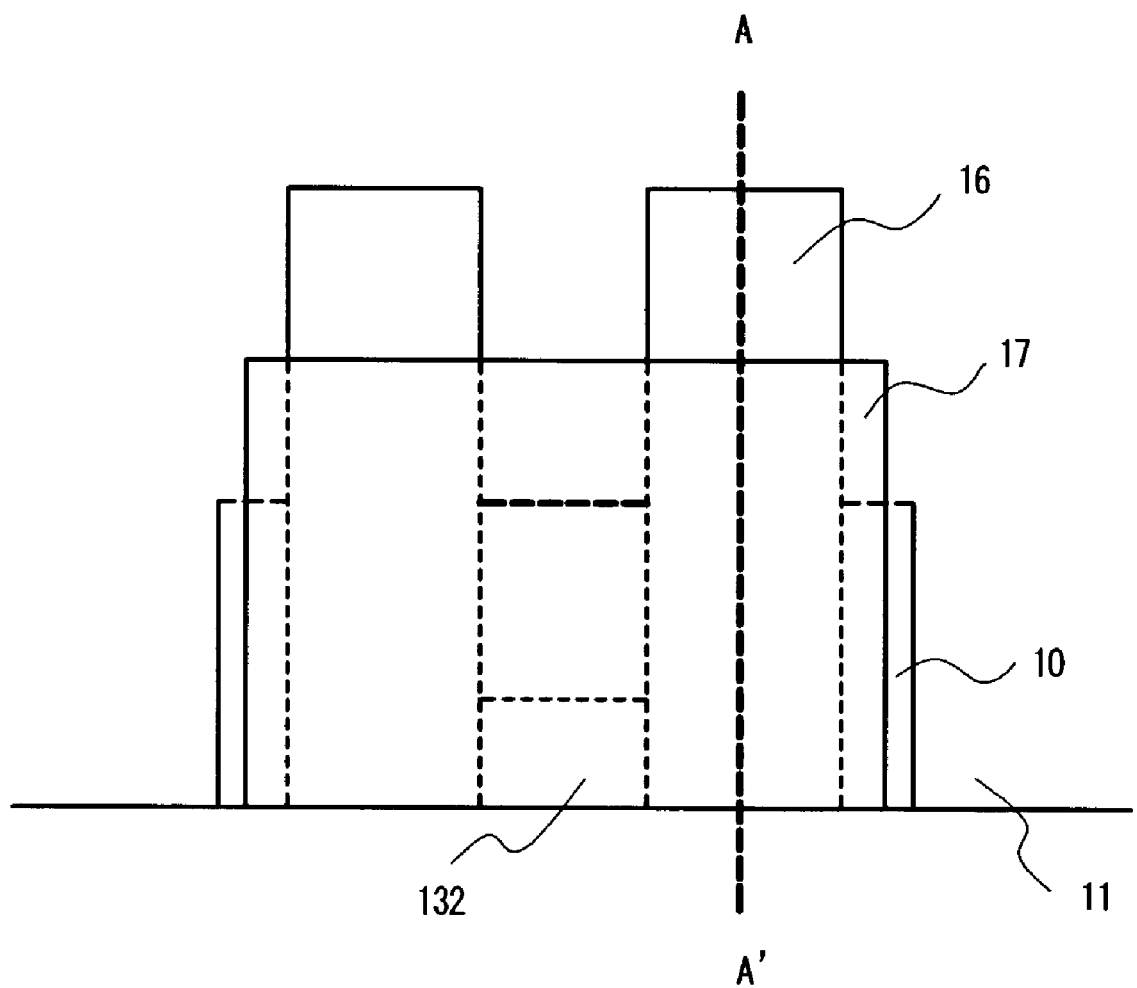
FIG. 9 is a top view of a disadvantageous magnetoresistive head of CPP structure.
Figure 10:
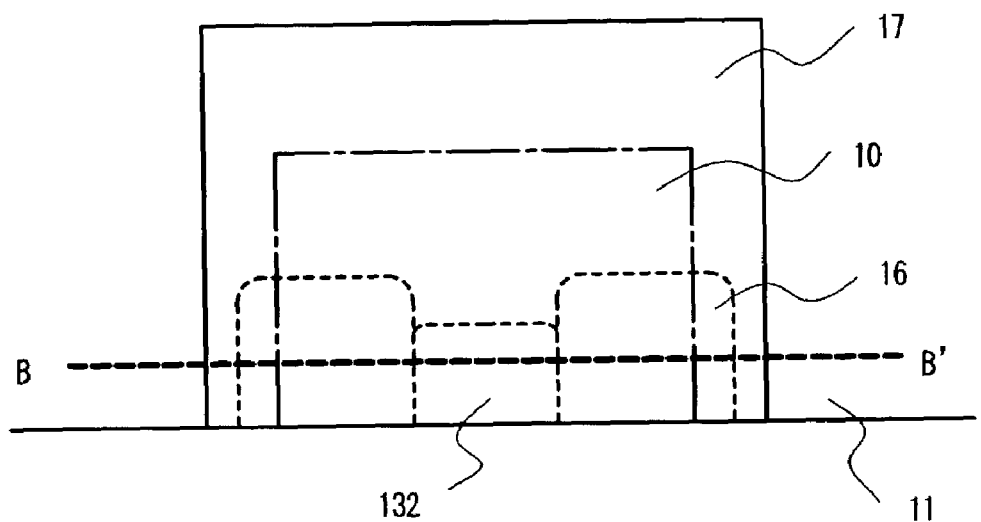
FIG. 10 is a top view of another disadvantageous magnetoresistive head of CPP structure.
Figure 11:
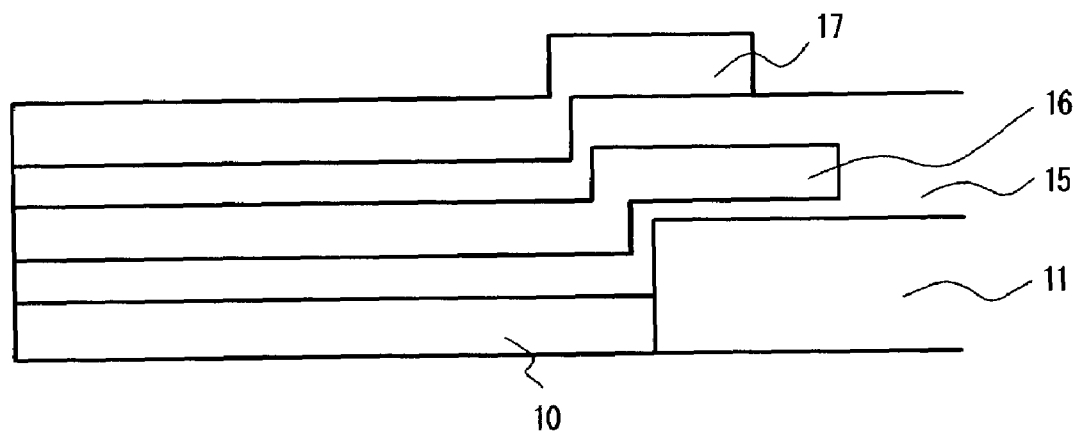
FIG. 11 is a top view of a disadvantageous magnetoresistive head of CPP structure.
Figure 12:
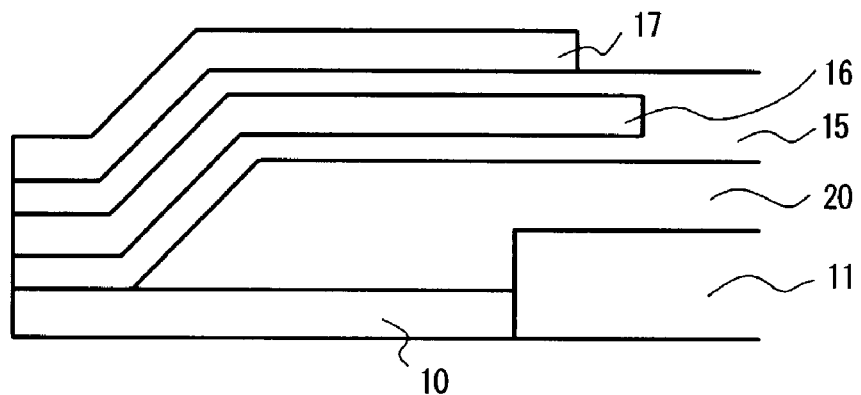
FIG. 12 is a top view of a disadvantageous magnetoresistive head of CPP structure pertaining to one embodiment of the present invention.
Figure 13:
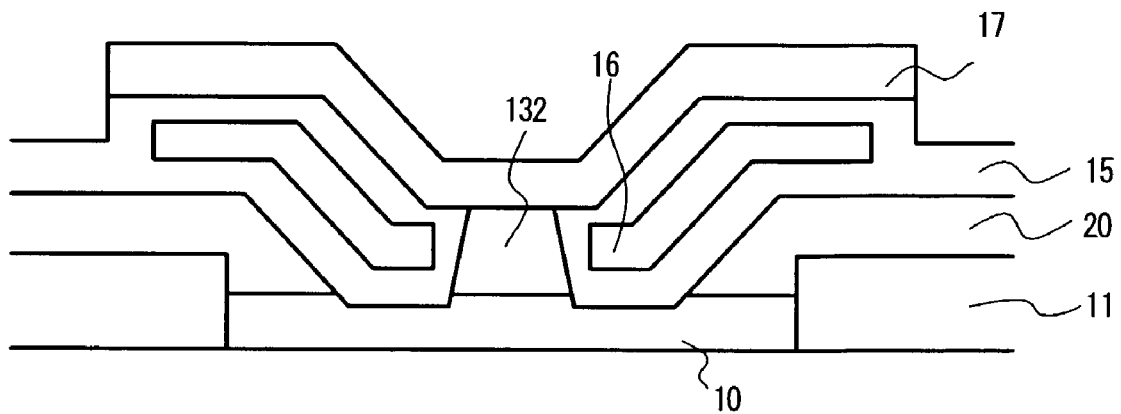
FIG. 13 is a top view of a disadvantageous magnetoresistive head of CPP structure pertaining to another embodiment of the present invention.

A magnetic disk apparatus with a high transfer rate needs a head with a reduced capacitance C. If a head of CPP structure is to meet this requirement, it is necessary to reduce the shield size further. FIGS. 9 and 10 are the top views of the head in which the shield layer has a reduced area. It should be noted that the longitudinal biasing layer 16 is formed on the boundary between the lower shield layer 10 and the non-magnetic insulating film 11 adjacent thereto. FIG. 11 is a cross sectional view taken along the line A–A' in FIG. 9. It should be noted that the space between the lower shield layer 10 and the longitudinal biasing layer 16 is small and the space between the longitudinal biasing layer 16 and the upper shield layer 17 is also small. This situation causes leakage of sensing current more easily than the situation shown in FIG. 5 or FIG. 7. In this case, a great improvement is made by proving the insulating protective film 20 as shown in FIG. 12. FIG. 13 is a sectional view taken along the line B–B' in FIG. 10. In this case, too, a great improvement is made by providing the insulating protective film 20 as shown in FIG. 13.

Another embodiment of the present invention demonstrated that the magnetoresistive head of improved structure in the above-mentioned example finds use as the read head for the magnetic disk unit with limited sensing current leakage.

According to the present invention, the magnetoresistive head illustrated in the above-mentioned example, is produced by the process which consists of a step of forming a lower shield layer on a substrate, a step of patterning said lower shield layer, a step of forming a non-magnetic film over the entire surface of the substrate, a step of planarizing said lower shield layer and said non-magnetic film such that they are approximately equal in thickness, a step of covering at least part of the boundary between said lower shield layer and said non-magnetic film, a step of forming a magnetoresistive film over the entire surface of the substrate, a step of patterning said magnetoresistive film, a step of covering with an insulating film at least part of the side wall formed by patterning said magnetoresistive film, and a step of forming the upper shield layer. Planarizing is effectively accomplished by mechanical polishing or chemical mechanical polishing. Planarizing is accomplished also by any of plasma etching, sputtering, ion milling, and reactive ion etching.

According to the present invention, it is possible to produce a magnetoresistive head of CPP structure having a TMR film or a CPP-GMR film as the magnetoresistive film. The production process minimizes the damage that occurs when the magnetoresistive film is patterned and also prevents leakage of sensing current and break-down across the lower shield layer and the upper shield layer. This contributes to production of high-output magnetoresistive heads in high yields. In addition, according to the present invention, it is possible to produce the magnetic disk apparatus with limited sensing current leakage.

The foregoing invention has been described in terms of preferred embodiments. However, those skilled, in the art will recognize that many variations of such embodiments exist. Such variations are intended to be within the scope of the present invention and the appended claims.

What is claimed is:

1. A magnetoresistive head of a type comprising a magnetoresistive film arranged between a lower shield layer and an upper shield layer, and a pair of electrodes to apply sensing current in a thickness direction of the magnetoresistive film,
    wherein the lower shield layer has a non-magnetic layer adjacent to it on a same layer level as the lower shield layer, and the non-magnetic layer is separated from the lower shield layer at a boundary at least part of which is covered with an insulating protective film,
    wherein the lower shield layer and the non-magnetic layer adjacent thereto are formed such that the non-magnetic layer has a height higher than the lower shield layer and they differ in height and they have a difference in level at their boundary.

2. The magnetoresistive head as defined in claim 1, wherein the insulating protective film only covers a portion of the lower shield layer, and the magnetoresistive head comprising a secondary insulating protective film covering a secondary portion of the lower shield layer.

3. The magnetoresistive head as defined in claim 2, wherein the magnetoresistive film directly contacts a contacting portion of the lower shield layer, and wherein a combination of the insulating protective film and the secondary insulating protective film covers portions of the lower shield layer other than the contacting portion.

4. The magnetoresistive head as defined in claim 1, wherein the insulating protective film is an etching-charge insulating protective film.

5. A magnetic data storage system which has the magnetoresistive head defined in claim 1.

6. The magnetoresistive head as defined in claim 1, comprising a detecting means to detect a change in resistance which the magnetoresisitive film makes as an external magnetic field changes.

7. A magnetoresistive head of a type comprising a magnetoresistive film arranged between a lower shield layer and an upper shield layer, and a pair of electrodes to apply sensing current in a thickness direction of the magnetoresistive film,
    wherein the lower shield layer has a non-magnetic layer adjacent to it within the same layer, and the non-magnetic layer the lower shield layer abut within the same layer at a boundary having at least part thereof covered with an insulating protective film, wherein the lower shield layer and the non-magnetic layer adjacent thereto are formed such that the non-magnetic layer has a height higher than the lower shield layer at the boundary, and the lower shield layer and the non-magnetic layer differ in thickness from one another.

8. The magnetoresistive head as defined in claim 7, wherein the insulating protective film only covers a portion of the lower shield layer, and the magnetoresistive head comprising a secondary insulating protective film covering a secondary portion of the lower shield layer.

9. The magnetoresistive head as defined in claim 8, wherein the magnetoresistive film directly contacts a contacting portion of the lower shield layer, and wherein a combination of the insulating protective film and the secondary insulating protective film covers portions of the lower shield layer other than the contacting portion.

10. The magnetoresistive head as defined in claim 7, wherein the insulating protective film is an etching-charge insulating protective film.

11. A magnetic data storage system which has the magnetoresistive head defined in claim 7.

12. The magnetoresistive head as defined in claim 7, comprising a detecting means to detect a change in resistance which the magnetoresisitive film makes as an external magnetic field changes.

* * * * *